US009738818B2

(12) United States Patent
Sherman et al.

(10) Patent No.: US 9,738,818 B2
(45) Date of Patent: Aug. 22, 2017

(54) UREA-BASED AND URETHANE-BASED PRESSURE SENSTIVE ADHESIVE BLENDS

(71) Applicant: 3M INNOVATIVE PROPERTIES COMPANY, St. Paul, MN (US)

(72) Inventors: Audrey A. Sherman, Woodbury, MN (US); Margot A. Branigan, Roseville, MN (US); Joan M. Noyola, Maplewood, MN (US); Ann R. H. Fornof, St. Paul, MN (US); Scott M. Tapio, Falcon Heights, MN (US); Joseph J. Faraci, Lafayette, LA (US)

(73) Assignee: 3M Innovative Properties Company, St. Paul, MN (US)

( * ) Notice: Subject to any disclaimer, the term of this patent is extended or adjusted under 35 U.S.C. 154(b) by 104 days.

(21) Appl. No.: 14/495,949

(22) PCT Filed: Mar. 22, 2013

(86) PCT No.: PCT/US2013/033498
§ 371 (c)(1),
(2) Date: Sep. 25, 2014

(87) PCT Pub. No.: WO2013/148506
PCT Pub. Date: Oct. 3, 2013

(65) Prior Publication Data
US 2015/0337185 A1 Nov. 26, 2015

Related U.S. Application Data
(60) Provisional application No. 61/618,093, filed on Mar. 30, 2012.

(51) Int. Cl.
| | | |
|---|---|---|
| C09J 175/02 | (2006.01) |
| C09J 7/02 | (2006.01) |
| C09J 133/14 | (2006.01) |
| C09J 133/02 | (2006.01) |
| C09J 133/08 | (2006.01) |
| C09J 133/06 | (2006.01) |
| C08G 18/50 | (2006.01) |
| C08G 18/75 | (2006.01) |
| C08G 18/32 | (2006.01) |

(52) U.S. Cl.
CPC ........ C09J 7/0207 (2013.01); C08G 18/3228 (2013.01); C08G 18/5024 (2013.01); C08G 18/758 (2013.01); C09J 7/0217 (2013.01); C09J 133/02 (2013.01); C09J 133/066 (2013.01); C09J 133/08 (2013.01); C09J 133/14 (2013.01); C09J 175/02 (2013.01); C08G 2170/40 (2013.01); C09J 2433/00 (2013.01); C09J 2433/003 (2013.01); C09J 2475/00 (2013.01)

(58) Field of Classification Search
CPC combination set(s) only.
See application file for complete search history.

(56) References Cited

U.S. PATENT DOCUMENTS

| | | | |
|---|---|---|---|
| RE24,906 E | * | 12/1960 | Ulrich .................. A61L 15/585 427/208 |
| 3,437,622 A | | 4/1969 | Dahl |
| 3,718,712 A | | 2/1973 | Tushaus |
| 3,761,307 A | | 9/1973 | Dahl |
| 3,767,040 A | | 10/1973 | Tushaus |
| 4,737,559 A | | 4/1988 | Kellen |
| 4,803,257 A | | 2/1989 | Goel |
| 4,816,333 A | | 3/1989 | Lange |
| 5,017,625 A | * | 5/1991 | Ansell .................. A61F 13/023 128/844 |
| 5,223,465 A | | 6/1993 | Ueki |
| RE34,605 E | | 5/1994 | Schrenk |
| 5,360,659 A | | 11/1994 | Arends |
| 5,579,162 A | | 11/1996 | Bjornard |
| 5,585,186 A | | 12/1996 | Scholz |
| 5,591,820 A | | 1/1997 | Kydonieus |
| 5,753,373 A | | 5/1998 | Scholz |
| 5,866,222 A | | 2/1999 | Seth |
| 5,873,931 A | | 2/1999 | Scholz |
| 5,882,774 A | | 3/1999 | Jonza |
| 5,910,536 A | * | 6/1999 | Kydonieus ............. C08G 18/10 522/90 |

(Continued)

FOREIGN PATENT DOCUMENTS

| | | |
|---|---|---|
| EP | 0250248 | 12/1987 |
| EP | 0539099 | 4/1993 |

(Continued)

OTHER PUBLICATIONS

Allport, "Property-Structure Relationships in Polyurethane Block Copolymers", Block Copolymers, 1973, pp. 443-492.
Bragg, "The Form Birefringence of Macromolecules", Acta Crystallographica, 1953, vol. 6, pp. 865-867.
Chen, "Study About Effect of Urea and Urethane Linkages on Phase Separation of Segmented Polyurethanes and Polyureas", Gaofenzi Cailiao Kexue Yu Gongcheng 1990, vol. 6, No. 5, pp. 66-71.
Chen, "The Study of Polyurethanes and Polyureas by Transmission Spectra of Fourier Transform Infrared Spectroscopy," Gaofenzi Cailiao Kexue Yu Gongcheng, 1993, vol. 9, No. 3, pp. 58-62.

(Continued)

Primary Examiner — Erma Cameron
(74) Attorney, Agent, or Firm — Jeffrey M. Olofson

(57) ABSTRACT

Adhesive compositions include a blend of a non-siloxane polyurea-based polymer, a non-siloxane polyurethane-based polymer, or a blend of a non-siloxane polyurea-based and non-siloxane polyurethane-based with at least one (meth) acrylate-based pressure sensitive adhesive. The non-siloxane polyurea-based polymer or non-siloxane polyurethane-based polymer is free of free radically polymerized groups. The adhesive composition is a self-wetting, optically clear pressure sensitive adhesive. The adhesive compositions can be coated on substrates to form adhesive articles.

22 Claims, No Drawings

(56) References Cited

U.S. PATENT DOCUMENTS

| | | | |
|---|---|---|---|
| 6,049,419 | A | 4/2000 | Wheatley |
| 6,518,359 | B1 | 2/2003 | Clemens |
| 6,642,304 | B1 | 11/2003 | Hansen |
| 6,824,820 | B1 | 11/2004 | Kinning |
| 7,108,911 | B2 | 9/2006 | Abe |
| 7,166,686 | B2 | 1/2007 | Olson |
| 7,255,920 | B2 | 8/2007 | Everaerts |
| 7,374,812 | B2 | 5/2008 | Mizuno |
| 8,124,169 | B2 | 2/2012 | Ylitalo |
| 8,742,022 | B2 | 6/2014 | Pokorny |
| 2007/0148473 | A1 | 6/2007 | Moore |
| 2010/0222496 | A1 | 9/2010 | Determan |
| 2011/0111240 | A1 | 5/2011 | Yuan |
| 2011/0123800 | A1 | 5/2011 | Sherman |

FOREIGN PATENT DOCUMENTS

| | | |
|---|---|---|
| JP | 62-297375 | 12/1987 |
| JP | 07-102233 | 4/1995 |
| JP | 2009-155532 | 7/2009 |
| WO | WO 00/75210 | 12/2000 |
| WO | WO 2005-044470 | 5/2005 |
| WO | WO 2009-085662 | 7/2009 |
| WO | WO 2010-132176 | 11/2010 |
| WO | WO 2012-027377 | 3/2012 |
| WO | WO 2012-074802 | 6/2012 |

OTHER PUBLICATIONS

International Search Report for PCT International Application No. PCT/US2013/033498, mailed on Jul. 5, 2013, 3pgs.

* cited by examiner

UREA-BASED AND URETHANE-BASED PRESSURE SENSTIVE ADHESIVE BLENDS

CROSS REFERENCE TO RELATED APPLICATIONS

This application is a national stage filing under 35 U.S.C. 371 of PCT/US2013/033498, filed Mar, 22, 2013, which claims priority to U.S. Provisional Application No. 61/618093, filed Mar. 30, 2012, the disclosure of which is incorporated by reference in its/their entirety herein.

FIELD OF THE DISCLOSURE

The present disclosure relates generally to the field of adhesives, specifically to the field of pressure sensitive adhesives and pressure sensitive adhesive blends that are non-siloxane and urea-based or urethane-based.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive (PSA) is particularly desirable for many applications.

PSAs are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear strength. The most commonly used polymers for preparation of PSAs are natural rubber, synthetic rubbers (e.g., styrene/butadiene copolymers (SBR) and styrene/isoprene/styrene (SIS) block copolymers), and various (meth) acrylate (e.g., acrylate and methacrylate) copolymers. With the exception of several (meth)acrylates, which are inherently tacky, these polymers are typically blended with appropriate tackifying resins to render them pressure sensitive.

Much less common classes of PSAs are those that are polyurethane-based or polyurea-based. Some examples of these types of PSAs are those based on polyurethane-based polymers, such as the polyether/polyurethane polymers described by Allport and Mohajer in Block Copolymers, D. C. Allport and W. H. Janes Ed., (1973) pp. 443-92. Also see U.S. Pat. No. 3,718,712 (Tushaus) and U.S. Pat. No. 3,767, 040 (Tushaus). It has been difficult to obtain balanced viscoelastic properties when using polyurethane-based polymers, however, which may explain their infrequent use when preparing PSAs. For example, U.S. Pat. No. 5,591,820 (Kydonieus et al.) indicates that existing polyurethane-based adhesives function either as weak elastics or high viscosity liquids. The former, weak elastics, tend to fail gradually by peeling away from surfaces to which they have been applied. The latter, high viscosity liquids, typically leave a residue upon removal from a surface and their cohesive strength is too low to withstand stresses applied in many applications. A series of polyurethane-based PSA dispersions have been described in U.S. Pat. No. 6,518,359 (Clemens et al.), and U.S. Pat. No. 6,642,304 (Hansen et al.). These polyurethane-based PSA dispersions are prepared from polyols of greater than 2,000 g/mol molecular weight.

Polyurethane-based polymers are typically prepared by reacting an isocyanate-functional material with a hydroxy-functional material. Some examples of polyurethane-based polymers used for formulating PSAs include those described in U.S. Pat. No. 3,437,622 (Dahl). Polyurethane-based polymers are not always desirable, however, because they typically require either a catalyst or external heat source to form the urethane linkages. For example, see U.S. Pat. No. 5,591,820 (Kydonieus et al.).

Furthermore, many polyurethane-based polymers must be crosslinked to have adequate cohesive strength as PSAs. There are two general methods used to crosslink polyurethane-based polymers. One method is chemical crosslinking through the formation of covalent bonds. However, the degree of chemical crosslinking must be carefully controlled so that the moduli of the resulting material is not increased to the extent that peel adhesion and tack are adversely affected. Furthermore, premature gelation of the adhesive and limited pot life of the PSA may also be problematic when using chemical crosslinking to bolster the cohesive strength of a PSA.

A common chemical crosslinking method described in the literature is the use of multivalent components to achieve a crosslinked network in the adhesive composition. For example, the crosslinked network may be formed by incorporating urethane or urea linkages between polyurethane polymer chains. Urea linkages are typically incorporated into the material by, for example, using a polyamine. For example, see JP-07-102,233 (Sekisui Chemical) and JP 62-297,375 (Kao Corp.). Some of the resulting materials purportedly have PSA properties, either in a partially cured state or in the final composition.

For example, U.S. Pat. No. 4,803,257 (Goel) describes a polyurethane adhesive (i.e., having structural or semi-structural properties) comprising a mixture of a polyisocyanate blocked with a phenolic agent and a polyamine curing agent. The composition may optionally include a polyepoxide. In the partially cured state, this composition is said to exhibit properties similar to those of PSAs. The compositions cure at room temperature to reach the full strength of a structural adhesive.

Also, U.S. Pat. Nos. 3,437,622 and 3,761,307 (Dahl) describe preparation of polyurethane polymers suitable for making PSAs, and which can be crosslinked with certain amines. Suitable amines are taught to be aromatic diamines or polyamines with the amino groups sterically or otherwise hindered by negative groups (Cl, Br, I, OH, etc). These negative groups decrease the reactivity of neighboring amino groups. When crosslinked, it is required that the amino groups be unreactive enough so that polyols and isocyanates can react to form polyurethane polymers before the isocyanates extensively react with the amino groups.

A second method of crosslinking polyurethane-based polymers is physical crosslinking. Physical crosslinking of such polymers typically involves incorporation of urea segments in the polyurethane-based polymeric chain using, for example, an amine chain extender. However, polyurea-based polymers are even less likely candidates for formulation into PSAs because polyureas have even higher moduli than the corresponding polyurethanes due to the chemical nature of the urea groups in polyureas. Accordingly, polyureas tend to be more elastic and adhesives prepared therefrom may not have adequate peel adhesion and tack, properties that may be desired for certain applications. For example, see Chen, Z. et al., "The Study of Polyurethanes and Polyureas by Transmission Spectra of Fourier Transform Infrared Spectroscopy," Gaofenzi Cailiao Kexue Yu Gongcheng 1993, 9(3), pp. 58-62 and Chen, Z, "Study About Effect of Urea and Urethane Linkages on Phase Separation of Segmented Polyurethanes and Polyureas," Gaofenzi Cailiao Kexue Yu Gongcheng 1990, 6(5), pp. 66-71. The higher moduli of polyureas present a problem when trying to formulate the polyureas into PSAs, particularly PSAs having adequate peel adhesion for many applications. Perhaps because of this apparent difficulty, there are very few descriptions of PSAs that are polyurea-based. Accordingly, polyurea-based polymers, particularly silicone polyurea-based polymers are typically used for release materials, such as those described in U.S. Pat. No. 5,866,222 (Seth et al.).

Another drawback of using polyurethane-based polymers for the formulation of PSAs is the difficulty often experienced in finding suitable tackifiers for the polymers. For example, U.S. Pat. No. 3,767,040 (Tushaus) teaches the use of certain unique tackifiers synthesized from cyclic terpene alcohols and aromatic isocyanates to provide polyurethane-based PSAs. Tushaus teaches, however, that the tackifiers therein were not found to be effective with natural rubber or styrene-butadiene rubbers or polyurethane polymers other than those specifically described therein to provide PSAs.

Polyurea-based polymers provide an alternative to polyurethane-based polymers. Polyureas are preparable by reacting an isocyanate-functional material with an amine-functional material. Advantageously, polyurea-based polymers typically do not require a catalyst or an external heat source for their preparation.

Among the few descriptions of polyurea-based PSAs, organosiloxane-polyurea block copolymers useful as PSAs are described by Leir et al. (EP Patent Publication No. 0 250 248 A2). The organosiloxane-polyurea block copolymers described therein are prepared by the condensation polymerization of a difunctional organopolysiloxane amine with a diisocyanate. The reaction may include an optional difunctional amine chain extender. These copolymers are stated to be useful, when tackified, as PSA compositions.

Leir et al., however, require the preparation of unique diaminopolysiloxanes. Leir et al. also teach that an approximately equal weight of the silicone tackifier resin with respect to the organosiloxane-polyurea block copolymer is used to make PSAs therein. The use of such highly tackified compositions may not be desirable, however, because tackifiers typically include a relatively high amount of low molecular weight impurities, which may be problematic in certain applications. Furthermore, certain such tackifiers generally tend to be relatively expensive.

Polyurea-based pressure sensitive adhesives and heat activated adhesives are described in U.S. Pat. No. 6,824,820 (Kinning et al.). These polyurea-based polymers are silicone free and require less tackifying agent than the corresponding siloxane-based polyurea PSAs.

New and modified adhesive chemistries are continuing to be developed in order to expand the useful properties of the PSAs. An example of a desirable property for PSAs is self wetting. Generally PSAs that are self wetting are ones that are very soft and conformable and are able to be applied with very low lamination pressure. Such adhesives exhibit spontaneous wet out to surfaces. Some examples of pressure sensitive adhesives that are self wetting have been described. EP Patent Publication 539,099 A2 (Sherman) describes laminates with a pressure sensitive adhesive that comprises a low modulus, self-wetting elastomer. The adhesive formulation has three components: an oligomer having either reactive vinyl or acrylate end groups or side chains; an acrylic monomer having n-hexyl, iso-decyl, n-decyl, 2-ethylhexyl, butyl, or lauryl side chains; and a UV sensitive photoinitiator. PCT Publication No. WO 2005/044470 describes a pressure sensitive adhesive comprising at least one radiation cured oligomer and/or monomer which is cured in situ on a substrate in the form of a coating. The adhesive comprises a polymer which comprises a plurality of polyether segments. US Patent Publication No. 2011/0111240 (Yuan et al.) describes an adhesive formulation that includes (a) a prepolymerized cross-linkable non-water soluble acrylic based pressure sensitive adhesive, (b) a cross-linking agent selected from the group consisting of metal chelates, silanes, epoxy-functional compounds, aziridine compounds, multifunctional amines, alkyl halide compounds, multifunctional acids, multifunctional mercaptans, multifunctional epoxy compounds, polyols in the presence of a catalyst, and combinations thereof, and (c) a polyol having a weight average molecular weight in the range of 1,000 to 10,000 g/mol.

SUMMARY

Disclosed herein are adhesive compositions, adhesive articles, and methods of preparing adhesive articles.

In some embodiments, the adhesive composition comprises a non-siloxane polyurea-based polymer, a non-siloxane polyurethane-based polymer, or a blend of a non-siloxane polyurea-based and non-siloxane polyurethane-based polymers and at least one (meth)acrylate-based pressure sensitive adhesive. The non-siloxane polyurea-based polymer or non-siloxane polyurethane-based polymer is free of free radically polymerized groups. The adhesive composition is a self-wetting, optically clear pressure sensitive adhesive.

In some embodiments, the non-siloxane polyurea-based polymer or non-siloxane polyurethane-based polymer comprises a segmented copolymer, which copolymer comprises repeating units of Formula I:

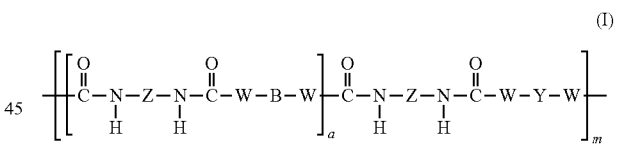

wherein: each W is N-D or O; each B is independently a polyvalent radical; each D is independently selected from the group consisting of hydrogen, an alkyl group, a cycloalkyl group, a phenyl group, a group that completes a ring structure that includes B to form a heterocycle, and mixtures thereof; each Z is independently a polyvalent radical; each Y is independently a polyoxyalkylene; m is an integer greater than zero; and a is zero or an integer greater than zero.

Also disclosed are adhesive articles that contain adhesive compositions coated on at least a portion of a major surface of a substrate. The adhesive compositions comprise a non-siloxane polyurea-based polymer, a non-siloxane polyurethane-based polymer, or a blend of a non-siloxane polyurea-based and non-siloxane polyurethane-based polymers and at least one (meth)acrylate-based pressure sensitive adhesive. The non-siloxane polyurea-based polymer or non-siloxane polyurethane-based polymer is free of free radically polymerized groups. The adhesive composition is a self-wetting, optically clear pressure sensitive adhesive. The substrate is the surface of an article, a tape backing, a film, a sheet, or a release liner.

Methods of preparing adhesive articles are also disclosed. In some embodiments, the method comprises providing a first adhesive composition, providing a substrate, and coating the first adhesive composition on at least a portion of at least one major surface of the substrate. The adhesive compositions comprise a non-siloxane polyurea-based polymer, a non-siloxane polyurethane-based polymer, or a blend of a non-siloxane polyurea-based and non-siloxane polyurethane-based polymers and at least one (meth)acrylate-based pressure sensitive adhesive. The non-siloxane polyurea-based polymer or non-siloxane polyurethane-based polymer is free of free radically polymerized groups. The adhesive composition is a self-wetting, optically clear pressure sensitive adhesive.

The non-siloxane polyurea-based and non-siloxane polyurethane-based polymers are prepared from the reaction of polyisocyanates with polyamines (in the case of polyurea-based polymers) or of polyisocyanates with polyols (in the case of polyurethane-based polymers). The polymers and the adhesive compositions prepared from them can be prepared either in a solvent-borne process, in a solventless process, or in a combination of solvent-borne and solventless processes.

DETAILED DESCRIPTION

The use of adhesives, especially pressure sensitive adhesives, in areas such as the medical, electronic and optical industries is increasing. The requirements of these industries place additional demands upon the pressure sensitive adhesive beyond the traditional properties of tack, peel adhesion and shear strength. New classes of materials are desirable to meet the increasingly demanding performance requirements for pressure sensitive adhesives.

A class of non-siloxane urea-based or non-siloxane urethane-based adhesive blends, specifically pressure sensitive adhesives, are disclosed. These adhesive blends are prepared from non-siloxane urea-based or non-siloxane urethane-based polymers blended with one or more pressure sensitive adhesives. In some embodiments the non-siloxane urea-based or non-siloxane urethane-based polymers contain polyoxyalkylene (polyether) groups.

The non-siloxane urea-based or non-siloxane urethane-based adhesive blends, especially pressure sensitive adhesive blends, have a variety of silicone-like properties. Among these properties are optical clarity, self wetting and removability.

The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a Tg (glass transition temperature) or melting point (Tm) above room temperature. When the temperature is elevated above the Tg or Tm, the storage modulus usually decreases and the adhesive becomes tacky. Typically glass transition temperature (Tg) is measured using Differentially Scanning calorimetry (DSC).

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "non-siloxane" as used herein refers to repeat units, to segmented copolymers or units of segmented copolymers that are free of silicone units. The terms silicone or siloxane are used interchangeably and refer to units with dialkyl or diaryl siloxane (—SiR$_2$O—) repeating units.

The term "urea-based" as used herein refers to macromolecules that are segmented copolymers which contain at least one urea linkage. The urea group has the general structure (—$^a$RN—(CO)—NR$^b$—) where (CO) defines a carbonyl group C═O, and each R$^a$ and R$^b$ is independently a hydrogen or an alkyl group.

The term "urethane-based" as used herein refers to macromolecules that are copolymers or segmented copolymers which contain at least one urethane linkage. The urethane group has the general structure (—O—(CO)—NR—) where (CO) defines a carbonyl group C═O, and R is hydrogen or an alkyl group.

The term "segmented copolymer" refers to a copolymer of linked segments, each segment constitutes primarily a single structural unit or type of repeating unit. For example, a polyoxyalkylene segmented copolymer may have the following structure:

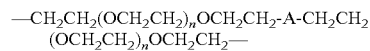

where A is the linkage between the 2 polyoxyalkylene segments, or it may have the following structure:

where A is the linkage between the polyoxyalkylene segment and the B segment.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, —CH$_2$CH$_2$(OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$— where R$^a$ is an alkylene and Ar$^a$ is an arylene (i.e., an alkylene is bonded to an arylene).

The term "(meth)acrylate" refers to monomeric acrylic or methacrylic esters of alcohols. Acrylate and methacrylate monomers are referred to collectively herein as "(meth) acrylate" monomers.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically clear" refers to an adhesive or article that has a high light transmittance over at least a portion of the visible light spectrum (about 400 to about 700 nm), and that exhibits low haze.

Unless otherwise indicated, "self wetting" refers to an adhesive which is very soft and conformable and is able to be applied with very low lamination pressure. Such adhesives exhibit spontaneous wet out to surfaces.

Unless otherwise indicated, "removable" refers to an adhesive that has relatively low initial adhesion (permitting temporary removability from and repositionability on a substrate after application), with a building of adhesion over time (to form a sufficiently strong bond), but remains "removable" i.e. the adhesion does not build beyond the point where it is permanently cleanly removable from the substrate.

Self-wetting, optically clear pressure sensitive adhesive compositions are disclosed that comprise a non-siloxane polyurea-based polymer, a non-siloxane polyurethane-based polymer, or a blend of a non-siloxane polyurea-based and non-siloxane polyurethane-based polymers, and at least one (meth)acrylate-based pressure sensitive adhesive. The non-siloxane polyurea-based polymer or non-siloxane polyurethane-based polymer is free of free radically polymerized groups. In other words, the non-siloxane polyurea-based polymer or non-siloxane polyurethane-based polymer is prepared by a condensation reaction or a series of condensation reactions and not from free radical polymerization.

The pressure sensitive adhesive blends of this disclosure have a variety of desirable properties, beyond the typical pressure sensitive adhesive properties of peel adhesion and shear strength. Among these properties are optical clarity and self-wetting (these properties are described above). Generally, these pressure sensitive adhesive blends are also removable, both temporarily and permanently. By removable it is meant that the pressure sensitive adhesive has relatively low initial adhesion (permitting temporary removability from and repositionability on a substrate after application), with a building of adhesion over time (to form a sufficiently strong bond), but remains "removable" i.e. the adhesion does not build beyond the point where it is permanently cleanly removable from the substrate. In some embodiments, the pressure sensitive adhesive blends of this disclosure additionally have a relatively high refractive index of 1.48 or greater. A description of these properties and how they are measured and determined are described below, particularly in the Examples section.

In order to form an optically clear pressure sensitive adhesive blend, typically the components of the blend are optically clear. Therefore, generally the non-siloxane polyurea-based polymers or non-siloxane polyurethane-based polymers used in the pressure sensitive adhesive blends are optically clear. The non-siloxane polyurea-based polymer or non-siloxane polyurethane-based polymer comprises a segmented copolymer, with repeating units of Formula I:

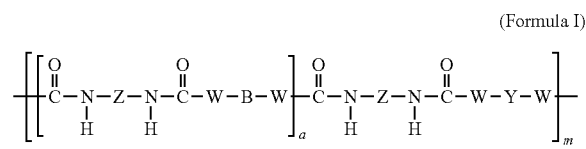

(Formula I)

where: each W is N-D or O; each B is independently a polyvalent radical; each D is independently selected from the group consisting of hydrogen, an alkyl group, a cycloalkyl group, a phenyl group, a group that completes a ring structure that includes B to form a heterocycle, and mixtures thereof; each Z is independently a polyvalent radical; each Y is independently a polyoxyalkylene; m is an integer greater than zero; and a is zero or an integer greater than zero.

When W is N-D (a nitrogen atom substituted with a hydrogen atom, an alkyl or aryl group or a group that completes a ring structure that includes the B group), the polymer is a urea-based polymer. The urea-based polymers contain at least urea linking groups and may also in some embodiments include urethane or ester linkages. The urea linkages are formed from the reaction of an isocyanate group with an amine group. The amine may be a primary or secondary amine, if the amine is a primary amine the D group is a hydrogen, if the amine is a secondary amine the D group is an alkyl or aryl group or a group that completes a ring structure that includes the B group.

When W is an oxygen atom, the polymer is a urethane-based polymer. The urethane-based polymers contain at least urethane linking groups and may also in some embodiments include urea or ester linkages. The urethane linkages are formed from the reaction of an isocyanate group with the hydroxyl group of an alcohol.

The polyurea-based or polyurethane-based polymers provide many advantages. For example, the physical force of attraction between urea or urethane groups on adjacent polymer chains or of the urea or urethane groups with hydrogen atoms present on the acrylate-based pressure sensitive adhesive provides increased cohesive strength to adhesives in which they are used. This phenomenon is generally referred to as "hydrogen bonding", and results from the interaction of electronegative groups (such as the nitrogen and oxygen atoms of the urethane and urea groups) with the electropositive hydrogen atoms present on adjacent urea or urethane groups or on the acrylate-based pressure sensitive adhesive. Thus, advantageously, chemical crosslinking of the polymer may not be required.

While both urea-based polymers and urethane-based polymers are equally suitable, in some embodiments urea-based polymers may be easier to synthesize and therefore may be more desirable. The easier synthesis of urea linkages relative to urethane linkages can result from the generally higher reactivity of amines with isocyanates than alcohols with isocyanates. Often, the reaction of alcohols with isocyanates requires the application of heat and/or the use of a catalyst, whereas many amine-isocyanate reactions are spontaneous at room temperature (roughly 20-25° C.).

The segmented copolymers described by Formula I are prepared by the reaction of polyisocyanates with amines, alcohols, or a combination of amines and alcohols. The selection of polyisocyanate, amine and alcohol reactants determines the composition of the "Z", "Y", and "B" groups in Formula I and controls the properties of the formed segmented copolymers. The "Z" group is central portion of a polyisocyanate (generally a diisocyanate) to which are attached the —NCO functional groups. Similarly, the "Y" and "B" groups are the central portions of amines or alcohols which are attached to —NDH or —OH groups. Each of these materials will be described in greater detail below.

Whether Formula I is a polyurea-based segmented copolymer or a polyurethane-based segmented copolymer, a polyisocyanate starting material is used in its preparation. The polyisocyanates used to make the segmented copolymers of this disclosure have at least two isocyanate functional groups, and generally, diisocyanates are used. However, in some embodiments, polyisocyanates having three or more isocyanate functional groups can be used, particularly when crosslinking of the polyurea-based polymer is desired.

Examples of diisocyanates useful to prepare the segmented copolymers of the present disclosure are represented by Formula II:

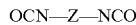  (Formula II)

wherein Z is as defined above.

Examples of suitable diisocyanates include, but are not limited to, aromatic diisocyanates (e.g., 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3',5,5'-tetraethyl) diphenylmethane; 4,4'-diisocyanato-3,3'-dimethoxybiphenyl (o-dianisidine diisocyanate); 5-chloro-2,4-toluene diisocyanate; and 1-chloromethyl-2,4-diisocyanato benzene), aromatic-aliphatic diisocyanates (e.g., m-xylylene diisocyanate and tetramethyl-m-xylylene diisocyanate), aliphatic diisocyanates (e.g., 1,4-diisocyanatobutane; 1,6-diisocyanatohexane; 1,12-diisocyanatododecane; and 2-methyl-1,5-diisocyanatopentane), and cycloaliphatic diisocyanates (e.g., methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), and other compounds (e.g., alkyl, polyoxyalkyl, polyester, polybutadienyl, and the like) terminated by two isocyanate functional groups (e.g., the diurethane of toluene-2,4-diisocyanate-terminated polypropylene oxide glycol).

Particularly suitable diisocyanates include: 2,6-toluene diisocyanate; methylenediphenylene-4,4'-diisocyanate; polycarbodimide-modified methylenediphenyl diisocyanate; 4,4'-diisocyanato-3,3'-dimethoxybiphenyl(o-dianisidine diisocyanate); tetramethyl-m-xylylene diisocyanate; methylenedicyclohexylene-4,4'-diisocyanate; 3-isocyanatomethyl-3,5,5-trimethylcyclohexyl isocyanate (isophorone diisocyanate); 1,6-diisocyanatohexane; 2,2,4-trimethylhexyl diisocyanate; and cyclohexylene-1,4-diisocyanate. More particularly desirable are tetramethyl-m-xylylene diisocyanate, 3-isocyanatomethyl-3,5,5-trimethylcyclohexyl isocyanate (isophorone diisocyanate), and methylenedicyclohexylene-4,4'-diisocyanate.

Triisocyanates include, but are not limited to, polyfunctional isocyanates, such as those produced from biurets, isocyanurates, adducts and the like. Some commercially available polyisocyanates include portions of the DESMODUR and MONDUR series from Bayer; Pittsburgh, Pa. and the PAPI series of Dow Plastics; Midland, Mich. Particularly suitable triisocyanates include those available from Bayer under the trade designations DESMODUR N-3300 and MONDUR 489.

When the segmented copolymer is polyurea-based or contains urea linkages, at least one polyamine is used to prepare the segmented copolymer. Any suitable compound having at least two amine functional groups can be used as the polyamine. For example, the compound may be a diamine, triamine, etc. Examples of polyamines useful in the present disclosure include, but are not limited to, polyoxyalkylene polyamines, and alkylene polyamines. Mixtures of polyamines may also be used for the polyamine component.

Generally, the "Y" group is a non-siloxane group, meaning that it is essentially free of siloxane groups. While the "Y" group of Formula I may comprise an alkylene group, in many embodiments it comprises a polyoxyalkylene group. This polyoxyalkylene group is incorporated into the segmented copolymer by the reaction of a polyoxyalkylene polyamine Examples of suitable polyoxyalkylene polyamines include polyoxyethylene polyamines, polyoxypropylene polyamines, polyoxytetramethylene polyamines, and mixtures thereof.

In many embodiments, the polyoxyalkylene polyamine is a diamine of the structure of Formula III:

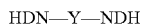  (Formula III)

where D is as defined above. In some embodiments, each D is an H, and the diamine of Formula III is a primary diamine. In other embodiments, the D group is alkyl group or aryl group, and the diamine of Formula III is a secondary diamine.

Many polyoxyalkylene polyamines are commercially available. For example, polyoxyalkylene diamines are available under trade designations such as D-230, D-400, D-2000, D-4000, DU-700, ED-2001 and EDR-148 (available from Huntsman Chemical; Houston, Tex. under the family trade designation JEFFAMINE).

In some embodiments, the polyoxyalkylene polyamine may be a polyoxyalkylene triamine. Examples or suitable polyoxyalkylene triamines are those available under trade designations such as T-3000 and T-5000 (available from Huntsman Chemical; Houston, Tex.).

While the "B" group of Formula I may comprise an polyoxyalkylene group, in many embodiments it comprises a alkylene group. This alkylene group is incorporated into the segmented copolymer by the reaction of an alkylene polyamine.

In many embodiments, the alkylene polyamine is an alkylene diamine of the structure of Formula IV:

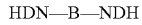  (Formula IV)

where D is as defined above. In some embodiments, each D is an H, and the diamine of Formula IV is a primary diamine. In other embodiments, the D group is an alkyl group, an aryl group, or a group that completes a ring structure that includes the B group, and the diamine of Formula IV is a secondary diamine.

A wide variety of alkylene polyamines are suitable. Such alkylene polyamines include, for example, ethylene diamine; propylene diamine; butylene diamine; hexamethylene diamine; cyclohexylene diamine; piperazine; 2-methyl piperazine; phenylene diamine; tolylene diamine; xylylene diamine; 3,3'-dinitrobenzidine; 4,4'-methylenebis(2-chloro aniline); 3,3'-dichloro-4,4'-biphenyl diamine; 2,6-diaminopyridine; 4,4'-diaminodiphenylmethane; menthane diamine; m-xylene diamine; isophorone diamine; and dipiperidyl propane. Many alkylene polyamines are also commercially available. For example, alkylene diamines are available under trade designations such as DYTEK A and DYTEK EP (available from DuPont Chemical; Wilmington, Del.).

Higher functional alkylene polyamines, such as triamines and tetramines can be used. Examples include, for example, diethylene triamine; triethylene tetramine; tris(2-aminoethyl)amine.

When the segmented copolymer is polyurethane-based or contains urethane linkages, at least one polyol is used to prepare the segmented copolymer. Any suitable compound having at least two hydroxyl functional groups can be used as the polyol. For example, the compound may be a diol, triol, etc. Examples of useful polyols include, but are not limited to, polyoxyalkylene polyols, and alkylene polyols. Mixtures of polyols may also be used for the polyol component. Additionally, as will be discussed in greater detail below, more complex polyols that are hydroxyl-capped prepolymers that contain polyurethane, polyester, polyamide, or polyurea linking groups, can also be used.

Generally, the "Y" group is a non-siloxane group, meaning that it is essentially free of siloxane groups. The "Y" group of Formula I is incorporated into the segmented copolymer by the reaction of a polyol, and a wide variety of polyols are suitable. In many embodiments, the polyol is a diol of the structure of Formula V:

HO—Y—OH                    (Formula V)

Examples of useful polyols include, but are not limited to, polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof, polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof), polyalkylene polyols, mixtures thereof, and copolymers therefrom. Polyoxyalkylene polyols are particularly useful.

When copolymers are used, chemically similar repeating units may be randomly distributed throughout the copolymer or in the form of blocks in the copolymer. Similarly, chemically similar repeating units may be arranged in any suitable order within the copolymer. For example, oxyalkylene repeating units may be internal or terminal units within a copolymer. The oxyalkylene repeating units may be randomly distributed or in the form of blocks within a copolymer. One example of a copolymer containing oxyalkylene repeating units is a polyoxyalkylene-capped polyoxyalkylene polyol (e.g., a polyoxyethylene-capped polyoxypropylene).

When higher molecular weight polyols (i.e., polyols having weight average molecular weights of at least about 2,000) are used, it is often desirable that the polyol component be "highly pure" (i.e., the polyol approaches its theoretical functionality—e.g., 2.0 for diols, 3.0 for triols, etc.). These highly pure polyols generally have a ratio of polyol molecular weight to weight % monol of at least about 800, typically at least about 1,000, and more typically at least about 1,500. For example, a 12,000 molecular weight polyol with 8 weight % monol has such a ratio of 1,500 (i.e., 12,000/8=1,500). Generally it is desirable that the highly pure polyol contains about 8% by weight monol or less.

Generally, as the molecular weight of the polyol increases in this embodiment, a higher proportion of monol may be present in the polyol. For example, polyols having molecular weights of about 3,000 or less desirably contain less than about 1% by weight of monols. Polyols having molecular weights of greater than about 3,000 to about 4,000 desirably contain less than about 3% by weight of monols. Polyols having molecular weights of greater than about 4,000 to about 8,000 desirerably contain less than about 6% by weight of monols. Polyols having molecular weights of greater than about 8,000 to about 12,000 desirably contain less than about 8% by weight of monols.

Examples of highly pure polyols include those available from Lyondell Chemical Company of Houston, Tex., under the trade designation, ACCLAIM, and certain of those under the trade designation, ARCOL.

The diol of Formula V may also be a hydroxyl-capped copolymer. These hydroxyl-capped copolymers can be prepared from a wide variety of precursor molecules. For example, the reaction of polyols, such as those described above, with less than stoichiometric amounts of diisocyanates can produce a hydroxyl-capped polyurethane copolymer. Examples of suitable diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5,5'-tetraethyl) biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate (isophorone diisocyanate).

An example of the synthesis of a HO—Y—OH copolymer is shown in Reaction Scheme 1 (where (CO) represents a carbonyl group C=O) below:

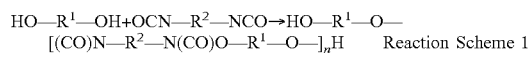

HO—R¹—OH+OCN—R²—NCO→HO—R¹—O—
[(CO)N—R²—N(CO)O—R¹—O—]$_n$H    Reaction Scheme 1 where n is one or greater, depending upon the ratio of polyol to diisocyanate, for example, when the ratio is 2:1, n is 1. Similar reactions between polyols and dicarboxylic acids or dianhydrides can give HO—Y—OH prepolymers with ester linking groups.

While the "B" group of Formula I may comprise a polyoxyalkylene group or a copolymer group as described for "Y" above, in many embodiments it comprises a alkylene group. This alkylene group is incorporated into the segmented copolymer by the reaction of an alkylene polyol.

In many embodiments, the alkylene polyol is an alkylene diol of the structure of Formula VI:

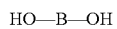 (Formula VI)

A wide variety of alkylene polyols are suitable. Such alkylene polyols include, for example, glycols such as ethylene glycol; propylene glycol; butylene glycol; hexamethylene glycol and the like.

In some embodiments, the polyurethane-based segmented copolymer of Formula I has a mixture of urea and urethane linking groups. An example of this type of segmented copolymer can be prepared from polyisocyanates of Formula II, diols of Formula V, and diamines of Formula IV. To prepare such a segmented copolymer, more than a stoichiometric amount of polyisocyanate can be reacted with a diol of Formula V to produce an isocyanate functional prepolymer. This prepolymer can then be reacted with the diamine of Formula IV to form the segmented copolymer of Formula I.

The polyurea-based and polyurethane-based polymers can be made by solvent processes, solventless processes (e.g., continuous solventless processes, such as reactive extrusion or polymerization on a surface or in a mold) or by a combination of these methods.

Some of the processes suitable for the preparation of the polyurea-based or polyurethane-based polymers include reacting at least one polyamine or polyol and at least one polyisocyanate in a reactor to form the polyurea-based or polyurethane-based polymer. The polyurea-based or polyurethane-based polymer can then be removed from the reaction vessel. Alternatively, the polymerization can be carried out by continuously mixing the reactants and depositing the reactants on a surface (e.g., release liner or substrate) or into a mold and polymerizing the mixture in place.

Properties of the polymers result from the molecular weight, architecture, and chemical composition of the polyurea-based or polyurethane-based polymer. For example, one skilled in the art can expect the optimum material for a particular application to be a function of the isocyanate-to-amine or alcohol ratio, polyisocyanate and polyamine or polyol architecture, order of reactant addition, mixing mechanism, mixing speed, reactor temperature, reactor configuration and size, and the presence of any fillers, additives, or property modifiers added, as well as other factors. Furthermore, if solventless processing is used, reactor throughput, residence time, and residence time distribution can affect the molecular weight and architecture of the resulting polyurea-based or polyurethane-based polymers produced. These variables allow those of skill in the art to vary the molecular weight, architecture, and chemical composition of the resulting polyurea-based or polyurethane-based polymers over quite a wide range, thus enabling one to tailor the properties to suit a variety of applications.

Any reactor that can provide intimate mixing of the polyamine or polyol and polyisocyanate reactants and the reaction product thereof is suitable for use in the preparation of these polymers. The reaction may be carried out, for example, as a batch process using, for example, a flask equipped with a mechanical or magnetic stirrer. Alternatively, the reaction may be carried out in a continuous process.

The reactants can be added simultaneously or sequentially into the reactor and in any sequential order. For example, polyisocyanate can be the first component added into the reactor. Polyamine or polyol can then be added downstream in the reactor. Alternately, the polyisocyanate can be added after the polyamine or polyol has been introduced into the reactor.

The adhesive compositions of this disclosure also include a (meth)acrylate-based pressure sensitive adhesive that is blended with the polyurea-based polymer, the polyurethane-based polymer or a combination of polyurea-based and polyurethane-based polymers. Generally, the (meth)acrylate-based pressure sensitive adhesive is optically clear. The (meth)acrylate-based pressure sensitive adhesives may comprise reinforcing monomers such as acidic monomers (such as acrylic acid), basic monomers (such as acrylamide), or high Tg monomers (such as styrene). In many embodiments the (meth)acrylate-based pressure sensitive adhesive is an acidic copolymer. Generally, as the proportion of acidic monomers used in preparing the acidic copolymer increases, the cohesive strength of the resulting adhesive also increases. The proportion of acidic monomers is usually adjusted depending on the proportion of acidic copolymer present in the blends of the present disclosure.

To achieve pressure sensitive adhesive characteristics, the corresponding copolymer can be tailored to have a resultant glass transition temperature (Tg) of less than about 0° C. Particularly suitable pressure sensitive adhesive copolymers are (meth)acrylate copolymers. Such copolymers typically are derived from monomers comprising about 40% by weight to about 98% by weight, often at least 70% by weight, or at least 85% by weight, or even about 90% by weight, of at least one alkyl (meth)acrylate monomer that, as a homopolymer, has a Tg of less than about 0° C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof. Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and copolymerizable basic or acidic monomers, provided that the Tg of the resultant (meth)acrylate copolymer is less than about 0° C.

When used, basic (meth)acrylate copolymers useful as the pressure sensitive adhesive matrix typically are derived from basic monomers comprising about 2% by weight to about 50% by weight, or about 5% by weight to about 30% by weight, of a copolymerizable basic monomer.

When used to form the pressure sensitive adhesive matrix, acidic (meth)acrylate copolymers typically are derived from acidic monomers comprising about 2% by weight to about 30% by weight, or about 2% by weight to about 15% by weight, of a copolymerizable acidic monomer.

In certain embodiments, the poly(meth)acrylic pressure sensitive adhesive matrix is derived from between about 1 and about 20 weight percent of acrylic acid and between about 99 and about 80 weight percent of at least one of isooctyl acrylate, 2-ethyl-hexyl acrylate or n-butyl acrylate composition. In some embodiments, the pressure sensitive adhesive matrix is derived from between about 2 and about 10 weight percent acrylic acid and between about 90 and about 98 weight percent of at least one of isooctyl acrylate, 2-ethyl-hexyl acrylate or n-butyl acrylate composition.

Another useful class of optically clear (meth)acrylate-based pressure sensitive adhesives are those which are (meth)acrylic block copolymers. Such copolymers may contain only (meth)acrylate monomers or may contain other co-monomers such as styrenes. Examples of such pressure sensitive adhesives are described, for example in U.S. Pat. No. 7,255,920 (Everaerts et al.).

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the pressure sensitive adhesive.

In some embodiments it is desirable for the composition to contain a crosslinking agent. The choice of crosslinking agent depends upon the nature of polymer or copolymer which one wishes to crosslink. The crosslinking agent is used in an effective amount, by which is meant an amount that is sufficient to cause crosslinking of the pressure sensitive adhesive to provide adequate cohesive strength to produce the desired final adhesion properties to the substrate of interest. Generally, when used, the crosslinking agent is used in an amount of about 0.1 part to about 10 parts by weight, based on the total amount of monomers.

One class of useful crosslinking agents include multifunctional (meth)acrylate species. Multifunctional (meth)acrylates include tri(meth)acrylates and di(meth)acrylates (that is, compounds comprising three or two (meth)acrylate groups). Typically di(meth)acrylate crosslinkers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris (2-hydroxy ethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylates, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates.

Another useful class of crosslinking agents contain functionality which are reactive with carboxylic acid groups on the acrylic copolymer. Examples of such crosslinkers include multifunctional aziridine, isocyanate and epoxy compounds. Examples of aziridine-type crosslinkers include, for example 1,4-bis(ethyleneiminocarbonylamino) benzene, 4,4'-bis(ethyleneiminocarbonylamino)diphenylmethane, 1,8-bis(ethyleneiminocarbonylamino)octane, and 1,1'-(1,3-phenylene dicarbonyl)-bis-(2-methylaziridine). The aziridine crosslinker 1,1'-(1,3-phenylene dicarbonyl)-bis-(2-methylaziridine) (CAS No. 7652-64-4), referred to herein as "Bisamide" is particularly useful. Common polyfunctional isocyanate crosslinkers include, for example, trimethylolpropane toluene diisocyanate, tolylene diisocyanate, and hexamethylene diisocyanate.

Typically the optically clear pressure sensitive adhesive matrix has a refractive index in the range of about 1.45-1.56. Many pressure sensitive adhesives have refractive indices of 1.47 or less, but recently pressure sensitive adhesives with higher refractive indices, such as at least 1.48 or even at least 1.50 or greater have been prepared, for example as described in U.S. Pat. No. 7,166,686 (Olson et al.). In some embodiments, the (meth)acrylate pressure sensitive adhesive has a refractive index of 1.48 or higher, and are referred to herein as "high refractive index (meth)acrylate pressure sensitive adhesives".

Refractive index is defined herein as the absolute refractive index of a material (e.g., a monomer or a polymer) which is understood to be the ratio of the speed of electromagnetic radiation in free space to the speed of the radiation in that material, with the radiation being of sodium yellow light at a wavelength of about 583.9 nanometers (nm). The refractive index can be measured using known methods and is generally measured using an Abbe Refractometer.

The high refractive index (meth)acrylate pressure sensitive adhesives comprise at least one aromatic monomer which is either substituted or unsubstituted. The pressure sensitive adhesives may further comprise at least one acrylic monomer selected from the group consisting of a monomeric acrylic or methacrylic acid ester of a non-tertiary alcohol and/or at least one polar monomer. The pressure sensitive adhesives optionally comprise other monomers which may be added to improve the properties of the adhesives, such as crosslinkers, and other additives such as tackifiers or plasticizers.

Suitable aromatic monomers are (meth)acrylate monomers that are typically high refractive index monomers, and generally have homopolymer glass transition temperatures at or below 50° C. These aromatic monomers, when polymerized alone or in the presence of other acrylic monomers, result in PSAs having RIs higher than are otherwise available. By adjusting the ratio of monomers, it is possible to make PSAs having RIs of at least 1.48.

Examples of suitable aromatic monomers include, but are not limited to, 6-(4,6-dibromo-2-isopropyl phenoxy)-1-hexyl acrylate, 6-(4,6-dibromo-2-sec-butyl phenoxy)-1-hexyl acrylate, 2,6-dibromo-4-nonylphenyl acrylate, 2,6-dibromo-4-dodecyl phenyl acrylate, 2-(1-naphthyloxy)-1-ethyl acrylate, 2-(2-naphthyloxy)-1-ethyl acrylate, 6-(1-naphthyloxy)-1-hexyl acrylate, 6-(2-naphthyloxy)-1-hexyl acrylate, 8-(1-naphthyloxy)-1-octyl acrylate, 8-(2-naphthyloxy)-1-octyl acrylate, 2-phenylthio-1-ethyl acrylate, and phenoxy ethyl acrylate.

In addition to the aromatic monomers described above, the high refractive index pressure sensitive adhesives generally also include a (meth)acrylate monomer. The (meth) acrylate monomers are typically present at ranges from about 0 to about 93 parts by weight. Useful (meth)acrylic monomers include at least one monomer selected from the group consisting of a monomeric acrylic or methacrylic acid ester of a non-tertiary alkyl alcohol, the alkyl group of which comprises from about 1 to about 12 carbon atoms, generally from about 4 to about 8 carbon atoms, and mixtures thereof.

Suitable (meth)acrylate monomers include, but are not limited to, those selected from the group consisting of the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like, and mixtures thereof. Such monomeric acrylic or methacrylic esters are known in the art and are commercially available.

In addition to the aromatic monomers and (meth)acrylate monomers described above, the high refractive index pressure sensitive adhesive may also comprise polar monomers.

Polar monomers are similar to the reinforcing monomers described above, and can be used to increase the cohesive strength of the pressure sensitive adhesive. Generally, polar monomers are typically present at ranges from about 0 to about 12 parts by weight, generally from about 2 to about 8 parts by weight. Useful polar monomers include, but are not limited to, those selected from the group consisting of ethylenically unsaturated carboxylic acids, ethylenically unsaturated sulfonic acids, and ethylenically unsaturated phosphoric acids, and mixtures thereof. Examples of such compounds include, but are not limited to, those selected from the group consisting of acrylic acid, methacrylic acid, itaconic acid, fumaric acid, crotonic acid, citraconic acid, maleic acid, B-carboxyethyl acrylate, sulfoethyl methacrylate, and the like, and mixtures thereof.

Other useful copolymerizable polar monomers include, but are not limited to, acrylamides, N,N-dialkyl substituted acrylamides, N-vinyl lactams, and N,N-dialkylaminoalkyl acrylates, and mixtures thereof. Illustrative examples include, but are not limited to, those selected from the group consisting of N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, and the like, and mixtures thereof.

Particularly suitable polar monomers include acrylic acid, methacrylic acid, itaconic acid, acrylamide, methacrylamide, acrylonitrile, methacrylonitrile, and mixtures thereof.

In order to increase the shear or cohesive strength of the high refractive index pressure sensitive adhesive, a crosslinking additive may be incorporated into the pressure sensitive adhesive.

Two main types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (CAS No. 7652-64-4), referred to herein as "Bisamide". Such chemical crosslinkers can be added into solvent-based PSAs after polymerization and activated by heat during oven drying of the coated adhesive.

In another embodiment, chemical crosslinkers which rely upon free radicals to carry out the crosslinking reaction may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide reagent.

The second type of chemical crosslinker is a photosensitive crosslinker which is activated by high intensity ultraviolet (UV) light. Two common photosensitive crosslinkers used for hot melt acrylic pressure sensitive adhesives are benzophenone and copolymerizable aromatic ketone monomers as described in U.S. Pat. No. 4,737,559. Another photocrosslinker, which can be post-added to the solution polymer and activated by UV light is a triazine, for example, 2,4-bis(trichloromethyl)-6-(4-methoxy-phenyl)-s-triazine. These crosslinkers are activated by UV light generated from artificial sources such as medium pressure mercury lamps or a UV blacklight.

Hydrolyzable, free-radically copolymerizable crosslinkers, such as monoethylenically unsaturated mono-, di-, and trialkoxy silane compounds including, but not limited to, methacryloxypropyltrimethoxysilane (available from Gelest, Inc., Tullytown, Pa.), vinyldimethylethoxysilane, vinylmethyldiethoxysilane, vinyltriethoxysilane, vinyltrimethoxysilane, vinyltriphenoxysilane, and the like, are also useful crosslinking agents.

Multi-functional acrylates are useful for bulk or emulsion polymerization. Examples of useful multi-functional acrylate crosslinking agents include, but are not limited to, diacrylates, triacrylates, and tetraacrylates, such as 1,6-hexanediol diacrylate, poly(ethylene glycol) diacrylates, polybutadiene diacrylate, polyurethane diacrylates, and propoxylated glycerin triacrylate, and mixtures thereof.

Crosslinker is typically present from 0 to about 1 part by weight based on 100 parts by weight adhesive solids.

Crosslinking may also be achieved using high energy radiation such as gamma or e-beam radiation. In this case, no crosslinker may be required.

In addition to the aromatic monomer, (meth)acrylate monomer and polar monomer, a variety of other monomers may be added to improve performance, reduce cost, etc. in quantities which do not render the pressure sensitive adhesive non-tacky. Examples of such other monomers include vinyl esters, vinyl acetate, 2-hydroxyethyl acrylate, styrene, substituted styrenes and the like.

In addition to the polyurea-based or polyurethane-based polymer and the (meth)acrylate-based pressure sensitive adhesive, optional property modifying additives can be added to the optically clear, self-wetting pressure sensitive adhesive of this disclosure provided that they do not interfere with the desired properties of the pressure sensitive adhesive. Typical property modifiers include tackifying agents (tackifiers) and plasticizing agents (plasticizers) to modify the adhesive performance of the formed adhesive composition. If used, the tackifiers and plasticizers are generally present in amounts ranging from about 5% to about 55% by weight, about 10 to about 45% by weight or even from about 10% to about 35% by weight.

Useful tackifiers and plasticizers are those conventionally used in the adhesive arts. Examples of suitable tackifying resins include terpene phenolics, alpha methyl styrene resins, rosin derived tackifiers, monomeric alcohols, oligomeric alcohols, oligomeric glycols, and mixtures thereof. Examples of useful plasticizing resins include terpene phenolics, rosin derived plasticizers, polyglycols and mixtures thereof. In some embodiments the plasticizer is isopropyl myristate or a polypropylene glycol.

In some embodiments, it may be desirable to add a plasticizer that has a relatively high refractive index, such as a refractive index of greater than 1.48. Plasticizers of this type can not only plasticize the adhesive matrix, but also raise the refractive index of the adhesive composition. Examples of such plasticizers include, benzyl benzoate, as well as plasticizers available from Ferro Corporation, Walton Hills, Ohio, under the trade designations "North American SANTICIZER 141", "North American SANTICIZER 154", and "North American SANTICIZER 160".

Adhesive articles are also disclosed. These articles comprise a substrate with the self-wetting, optically clear pressure sensitive adhesive compositions described above coated on at least a portion of a major surface of the substrate.

A wide variety of substrates are suitable to prepare adhesive articles of this disclosure. Examples of suitable substrates include the surface of an article, a tape backing, a film, a sheet, or a release liner.

Examples of substrates that are the surface of an article include, but are not limited to, the outer surface of an electronic display such as liquid crystal display or a cathode ray tube, the outer surface of a window or glazing, the outer surface of an optical component such as a reflector, polarizer, diffraction grating, mirror, or lens, or the like. The substrate can contain polymeric materials, glass materials, ceramic materials, metal-containing materials (e.g., metals or metal oxides), or a combination thereof. Representative examples of polymeric materials include polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

Examples of substrates that are tape backings include substrates prepared from a wide range of materials such as nonwoven materials, paper, metal foils, polymeric films such as: polyester films (e.g., PET polyethylene terephthalate); polyolefin films, such as polypropylene (e.g., biaxially oriented polypropylene (BOPP)), polyethylene, and mixtures thereof; polyurea films; polyurethane films; poly(meth)acrylate films; cellulose triacetate films; films prepared form renewable materials such as PLA (poly lactic acid); and the like. To form a tape, the pressure sensitive adhesive composition is coated onto at least a portion of the tape backing. A release material (e.g., low adhesion backsize) can be applied to the opposite side of the backing, if desired. When double-sided tapes are formed, the adhesive is coated onto at least a portion of both sides of the backing.

A wide range of films are suitable for use as the substrate in adhesive articles of this disclosure. Besides conventional films such as are described above as tape backings, a wide range of optical films are suitable substrates since the pressure sensitive adhesives are optically clear. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and antifingerprint films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings, anti-fingerprint coatings, antimicrobial coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. Examples of anti-fingerprint coatings include those described in pending U.S. Patent Application Ser. No. 61/486,000 filed May 13, 2011 titled: "COATING COMPOSITIONS COMPRISING NON-IONIC SURFACTANT EXHIBITING REDUCED FINGERPRINT VISIBILITY" which describes coatings prepared from a curable resin and a non-ionic surfactant. Examples of antimicrobial coatings include those described in U.S. Pat. No. 8,124,169 (Ylitalo et al.) which describe an antimicrobial coating system that includes a film-forming composition and an effective amount of an antimicrobial agent dispersed within the film-forming composition.

In certain embodiments, a coating can be added to the substrate to affect the optical properties of the substrate. An example of such a coating is a low refractive index coating. Examples of such coatings include those described in U.S. Pat. No. 7,374,812 (Mizuno) which describes silicone-modified fluoropolymers that are formed by first dissolving a fluoropolymer having at least one monomer of vinylidene fluoride coupled to a hexafluoropropylene monomer unit in an organic solvent and subsequently reacting the mixture with an amino silane coupling agent to form an aminosilane-modified fluoropolymer. The aminosilane fluoropolymer is subsequently heated and partially condensed with an oligomer of a silane compound including alkoxy silane. These silicone-modified fluoropolymers can be used to provide coatings that have a low refractive index. Coatings or substrates with low refractive index can be particularly useful with the self-wetting, optically clear pressure sensitive adhesive compositions described above, because, as described above, many embodiments of the adhesive compositions have high refractive indices. Therefore, a low refractive index layer can be adjacent to a high refractive index layer to give desirable optical properties such as anti-reflection.

Another class of low refractive index coatings that can be applied to a film or a substrate is porous coatings. These types of coatings are described in a series of patents: U.S. Pat. No. 5,585,186 (Scholz et al.); U.S. Pat. No. 5,873,931 (Scholz et al.); and U.S. Pat. No. 5,753,373 (Scholz et al.), which teach coatings with anti-reflective and anti-fogging properties. Each of these applications utilizes a porous inorganic metal oxide (such as, for example, silicon dioxide) in conjunction with an organic molecule or molecules. In U.S. Pat. No. 5,585,186 a silane or a siloxane oligomer is included, in U.S. Pat. No. 5,873,931 anionic surfactants are included, and in U.S. Pat. No. 5,753,373 polyhydroxy surfactants are included. In these references, the term "porous" refers to the presence of voids between the inorganic metal oxide particles created when the particles pack together. For single layer coatings, it is known that in order to maximize light transmission in air through an optically transparent substrate, and minimize reflection by the substrate, the refractive index of the coating should equal as closely as possible the square root of the refractive index of the substrate and the thickness of the coating should be one-fourth (¼) of the optical wavelength of the incident light. The voids in the coating provide a multiplicity of subwavelength interstices between the metal oxide particles where the refractive index (RI) abruptly changes from that of air (RI=1) to that of the metal oxide particles (e.g., for silica RI=1.44). By adjusting the porosity, a coating having a calculated refractive index (as shown in U.S. Pat. No. 4,816,333 (Lange, et al.)) very close to the square root of the refractive index of the substrate can be created. By utilizing coatings having optimal refractive indices, at coating thicknesses equal to approximately one-fourth the optical wavelength of the incident light, the percent transmission of light through the coated substrate is maximized and reflection is minimized. The voids in the coating are present substantially throughout; however, the coating may vary in density, e.g., the coating may become gradually more porous moving away from the substrate producing a gradient density. Such a gradient density enhances the anti-reflective property of the coating. Generally, the network has a porosity of about 25 to 45 volume percent, more typically about 30 to 40 volume percent, when dried. Porosity may be calculated from the refractive index of the coating according to published procedures such as in W. L. Bragg, A. B. Pippard, Acta Crystallographica, volume 6, page 865 (1953). When the metal oxide is silicon dioxide, this porosity provides a coating having a refractive index of 1.2 to 1.4, or even 1.25 to 1.36, which is approximately equal to the square root of the refractive indices of polyester, polycarbonate, or polymethyl methacrylate substrates. For example, a porous silica coating having a refractive index of 1.25 to 1.36 is capable of providing a highly anti-reflective surface when coated on a polyethylene terephthalate substrate (RI=1.64) at a thickness of 1000-1200 Angstroms.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

In addition to these films, a variety of additional polymeric film substrates are suitable such as, for example, optically clear stretchable films, graphic films, label stock films, transparent conductive films, and light guide films or substrates. Light guides are materials designed to transmit light by total internal reflection (TIR).

Another similar class of materials suitable for use as the substrate in pressure sensitive adhesive articles of this disclosure is sheet materials. Sheet materials include decorative, reflective, and graphical sheets, label stock sheets, and the like. The sheet can be any suitable type of material depending on the desired application. Typically, the sheet comprises a nonwoven, paper, or a polymeric film, such as those described above.

In some embodiments, the substrate is a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

The desirable features that the pressure sensitive adhesive impart to the adhesive articles make the adhesive articles suitable for application to a wide range of surfaces to form new articles. Among these properties are optical clarity, self-wetting and removability. Self wetting and removability can be especially important. The adhesive exhibits great conformability permitting them to spontaneously wet out substrates. The surface characteristics also permit the adhesives to be bonded and removed from the substrate repeatedly for repositioning or reworking. The strong cohesive strength of the adhesives gives them structural integrity limiting cold flow and giving elevated temperature resistance in addition to permanent removability. In some embodiments the initial removability of an adhesive coated article bonded to a glass substrate, as measured by the 90° Peel Adhesion test described in the Examples section below, is no greater than 2.9 Newtons/decimeter (75 grams per inch). Upon aging for one week at room temperature the removability, as measured by the 90° Peel Adhesion test described in the Examples section below, is no more than 7.7 Newtons/decimeter (200 grams per inch). In other embodiments, the removability after aging for at least one week at 85° C., as measured by the 90° Peel Adhesion test described in the Examples section below, is no more than 15.4 Newtons/decimeter (400 grams per inch), 7.7 Newtons/decimeter (200 grams per inch) or even 3.9 Newtons/decimeter (100 grams per inch).

Exemplary adhesive articles in which the self wetting and removability features are especially important include, for example: large format articles such as graphic articles and protective films; and information display devices.

Large-format graphic articles or protective films typically include a thin polymeric film backed by a pressure sensitive adhesive. These articles may be difficult to handle and apply onto a surface of a substrate. The large format article may be applied onto the surface of a substrate by what is sometimes called a "wet" application process. The wet application process involves spraying a liquid, typically a water/surfactant solution, onto the adhesive side of the large format article, and optionally onto the substrate surface. The liquid temporarily "detackifies" the pressure sensitive adhesive so the installer may handle, slide, and re-position the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate.

Examples of a large format protective films include window films such as solar control films, shatter protection films, decoration films and the like. In some instances the film may be a multilayer film such as a multilayer IR film (i.e., an infrared reflecting film), such as a microlayer film having selective transmissivity such as an optically clear but infrared reflecting film as described in U.S. Pat. No. 5,360,659 (Arends et al.).

While the wet application process has been used successfully in many instances, it is a time consuming and messy process. A "dry" application process is generally desirable for installing large format graphic articles. Adhesives that are self wetting and removable may be applied with a dry installation process. The articles are easily attached to a large substrate because they are self wetting and yet they may be easily removed and repositioned as needed.

In other applications, such as information display devices, the wet application process cannot be used. Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc) reflective sheeting and the like.

A wide variety of information display devices are in use, both illuminated devices and non-illuminated devices. Many of these devices utilize adhesive articles, such as adhesive coated films, as part of their construction. One adhesive article frequently used in information display devices is a protective film. Such films are frequently used on information display devices that are frequently handled or have exposed viewing surfaces.

The adhesive articles of this disclosure may be prepared by providing a first optically clear pressure sensitive adhesive, providing a substrate with a first major surface and a second major surface, and coating the adhesive composition on at least a portion of at least the first or the second major surface of the substrate. The first adhesive composition comprises the self-wetting optically clear pressure sensitive adhesives described above. The substrates comprise the substrates described above.

The self-wetting optically clear pressure sensitive adhesive comprises a non-siloxane polyurea-based polymer, a non-siloxane polyurethane-based polymer, or a blend of a non-siloxane polyurea-based and non-siloxane polyurethane-based polymers, and at least one (meth)acrylate-based pressure sensitive adhesive.

Non-siloxane polyurea-based polymers are prepared as described above from the reaction of polyisocyanates and amines, and may be carried out either in solvent or in a solventless process. The non-siloxane polyurethane-based polymers are similarly prepared from the reaction of polyisocyanates and alcohols (or other hydroxyl-functional materials), and also may be carried out in solvent or in a solventless process.

The non-siloxane polyurea-based polymer, the non-siloxane polyurethane-based polymer or a combination of polymers is then mixed with a (meth)acrylate-based pressure sensitive adhesive. Methods for preparing the (meth)acrylate-based pressure sensitive adhesive are described above. In some embodiments, the (meth)acrylate-based pressure sensitive adhesive is a high refractive index pressure sensitive adhesive as described in U.S. Pat. No. 7,166,686 (Olson et al.). The (meth)acrylate-based pressure sensitive adhesive may be dissolved or suspended in a solvent or it may be 100% solids.

The pressure sensitive adhesive blend can be prepared in solvent, by solventless processes or by a combination of solvent and selventless processes. For example, if both the non-siloxane polyurea-based polymer, the non-siloxane polyurethane-based polymer or a combination of polymers and the (meth)acrylate-based pressure sensitive adhesive are dissolved or suspended in a solvent or solvents, the two solutions can be mixed to form a solvent-borne pressure sensitive adhesive blend. Similarly, if only one or the other of the non-siloxane polyurea-based polymer, the non-siloxane polyurethane-based polymer or a combination of polymers and the (meth)acrylate-based pressure sensitive adhesive are dissolved or suspended in a solvent or a mixture of solvents, the other can added to this solution and the resulting mixture stirred or shaken to form a solvent-borne pressure sensitive adhesive blend.

The solvent-borne pressure sensitive adhesive blend can be coated on the substrate by any suitable process, such as by, for example, knife coating, roll coating, gravure coating, rod coating, curtain coating, and air knife coating. The pressure sensitive adhesive blend may also be printed by known methods such as screen printing or inkjet printing. The pressure sensitive adhesive coating is typically then dried to remove the solvent. In some embodiments the coating is subjected to increased temperatures such as supplied by an oven (e.g. a forced air oven) in order to expedite the drying of the pressure sensitive adhesive.

The pressure sensitive adhesive blend may also be prepared in a solventless process such as hot melt mixing. A variety of hot melt mixing techniques using a variety of hot melt mixing equipment are suitable for preparing the pressure sensitive adhesives of this disclosure. Both batch and continuous mixing equipment may be used. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). Examples of continuous methods include single screw extruding, twin screw extruding, disk extruding, reciprocating single screw extruding, and pin barrel single screw extruding. Continuous methods can utilize distributive elements, pin mixing elements, static mixing elements, and dispersive elements such as MADDOCK mixing elements and SAXTON mixing elements. A single hot melt mixing apparatus may be used, or a combination of hot melt mixing equipment may be used to prepare the hot melt blends and the pressure sensitive adhesives of this disclosure. In some embodiments, it may be desirable to use more than one piece of hot melt mixing equipment. For example, one extruder, such as, for example, a single screw extruder, can be used to hot melt process the non-siloxane polyurea-based polymer, the non-siloxane polyurethane-based polymer or a combination of polymers. The output of this extruder can be fed into a second extruder, for example, a twin screw extruder for hot melt mixing with the (meth)acrylate-based pressure sensitive adhesive.

The output of the hot melt mixing is coated onto a substrate to form a pressure sensitive adhesive layer. If a batch apparatus is used, the hot melt blend can be removed from the apparatus and placed in a hot melt coater or extruder and coated onto a substrate. If an extruder is used to prepare the hot melt blend, the blend can be directly extruded onto a substrate to form an adhesive layer in a continuous forming method. Examples of suitable substrates are described above for use with solvent-borne coating methods. In the continuous forming method, the adhesive can be drawn out of a film die and subsequently contacted to a moving plastic web or other suitable substrate. If the adhesive is to be part of a tape, the substrate may be a tape backing. In some methods, the tape backing material is coextruded with the adhesive from a film die and the multilayer construction is then cooled to form the tape in a single coating step. If the adhesive is to be a transfer tape, the pressure sensitive adhesive layer may be a free standing film and the substrate may be a release liner or other releasing substrate. After forming, the pressure sensitive adhesive layer or film can be solidified by quenching using both direct methods (e.g. chill rolls or water batch) and indirect methods (e.g. air or gas impingement).

A combination of solventless and solvent-borne mixing and coating techniques may also be used. For example a solvent-borne pressure sensitive adhesive blend can be prepared, dried and hot melt coated. Similarly, a hot melt adhesive blend can be dissolved in one or more solvents and coated.

The thickness of the coated pressure sensitive adhesive layer using either the solvent-borne coating method or solventless coating method will depend upon a variety of factors, including the desired use for the pressure sensitive adhesive article. Typically, the thickness of the adhesive layer tends to be greater than about 5 micrometers (μm), greater than about 10 μm, greater than about 15 μm, or even greater than about 20 μm. The thickness is often less than about 1000 μm, less than about 250 μm, less than about 200 μm, or even less than about 175 μm. For example, the thickness can be from about 5 to about 1000 μm, from about 10 to about 500 μm, from about 25 to about 250 μm, or from about 50 to about 175 μm.

The present disclosure includes the following embodiments.

Among the embodiments are adhesive compositions. The first embodiment includes an adhesive composition comprising: a non-siloxane polyurea-based polymer, a non-siloxane polyurethane-based polymer, or a blend of a non-siloxane polyurea-based and non-siloxane polyurethane-based polymers, wherein the non-siloxane polyurea-based polymer or non-siloxane polyurethane-based polymer is free of free radically polymerized groups; and at least one (meth)acrylate-based pressure sensitive adhesive, wherein the adhesive composition comprises a self-wetting, optically clear pressure sensitive adhesive.

Embodiment 2 is the composition of embodiment 1, wherein the non-siloxane polyurea-based polymer or non-siloxane polyurethane-based polymer comprises a segmented copolymer, which copolymer comprises repeating units of Formula I:

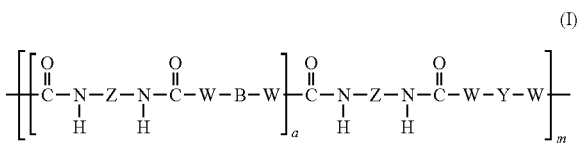

wherein: each W is N-D or O; each B is independently a polyvalent radical; each D is independently selected from the group consisting of hydrogen, an alkyl group, a cycloalkyl group, a phenyl group, a group that completes a ring structure that includes B to form a heterocycle, and mixtures thereof; each Z is independently a polyvalent radical; each Y is independently a polyoxyalkylene; m is an integer greater than zero; and a is zero or an integer greater than zero.

Embodiment 3 is the composition of embodiment 1 or 2, wherein Y is selected from the group consisting of polyethylene oxide, polypropylene oxide, polytetramethylene oxide, or a combination thereof.

Embodiment 4 is the composition of embodiment 2 or 3, wherein W is N-D.

Embodiment 5 is the composition of any of embodiments 2-4, wherein a is an integer greater than zero.

Embodiment 6 is the composition of any of embodiments 2-5, wherein B is a polyalkylene or a polyoxyalkylene.

Embodiment 7 is the composition of any of embodiments 1-6, further comprising at least one plasticizer.

Embodiment 8 is the composition of embodiment 7, wherein the plasticizer has a refractive index of greater than 1.48.

Embodiment 9 is the composition of any of embodiments 1-8, wherein the (meth)acrylate-based pressure sensitive adhesive comprises a (meth)acrylate copolymer comprising at least one alkyl (meth)acrylate monomer and at least one reinforcing monomer.

Embodiment 10 is the composition of embodiment 9, wherein the (meth)acrylate-based pressure sensitive adhesive comprises a refractive index of greater than 1.48.

Among the embodiments are articles. Embodiment 11 is an adhesive article comprising: a substrate with a first major surface and a second major surface; and an adhesive composition coated on at least a portion of at least the first or second major surface of the substrate, wherein the adhesive composition comprises: a non-siloxane polyurea-based polymer, a non-siloxane polyurethane-based polymer, or a blend of a non-siloxane polyurea-based and non-siloxane polyurethane-based polymers, wherein the non-siloxane polyurea-based polymer or non-siloxane polyurethane-based polymer is free of free radically polymerized groups; and at least one (meth)acrylate-based pressure sensitive adhesive, wherein the adhesive composition comprises a self-wetting, optically clear pressure sensitive adhesive.

Embodiment 12 is article of embodiment 11, wherein the substrate is the surface of an article, a tape backing, a film, a sheet, or a release liner.

Embodiment 13 is the article of embodiment 12, wherein the film comprises an optically active film comprising a visible mirror film, a color mirror film, a solar reflective film, a diffusive film, an infrared reflective film, an ultraviolet reflective film, a reflective polarizer film such as a brightness enhancement film or a dual brightness enhancement film, an absorptive polarizer film, an optically clear film, a tinted film, a dyed film, a privacy film such as a light-collimating film, a color filter film, an antireflective film, an antiglare film, a soil resistant film, or an antifingerprint film.

Embodiment 14 is the article of embodiment 12, wherein the film comprises a polymeric film comprising an optically clear stretchable film, a graphic film, a label stock film, or a transparent conductive film.

Embodiment 15 is the article of embodiment 11, wherein the substrate comprises a light guide film or substrate.

Embodiment 16 is the article of embodiment 12, wherein the release liner comprises a structured release liner.

Among the embodiments are methods of preparing articles. Embodiment 17 is a method of preparing an adhesive article comprising: providing a first adhesive composition comprising: a non-siloxane polyurea-based polymer, a non-siloxane polyurethane-based polymer, or a blend of non-siloxane polyurea-based and non-siloxane polyurethane-based polymers; and at least one (meth)acrylate-based pressure sensitive adhesive to form a self-wetting, optically clear pressure sensitive adhesive; providing a substrate with a first major surface and a second major surface; and coating the first adhesive composition on at least a portion of at least the first or the second major surface of the substrate.

Embodiment 18 is the method of embodiment 17, wherein providing an adhesive composition comprises preparing a non-siloxane polyurea-based polymer, comprising: providing at least one polyisocyanate; providing at least one polyamine; reacting the at least one polyisocyanate with the at least one polyamine to form the polyurea-based polymer.

Embodiment 19 is the method of embodiment 18, wherein the at least one polyamine comprises a polyoxyalkylene diamine.

Embodiment 20 is the method of embodiment 18 or 19, further comprising providing a second polyamine.

Embodiment 21 is the method of embodiment 20, wherein the second polyamine comprises a polyalkylene diamine, a polyarylene diamine, a polyoxyalkylene diamine or mixture thereof.

Embodiment 22 is the method of any of embodiments 18-21, wherein the preparing the polyurea-based polymer comprises polymerizing in a solution containing the (meth)acrylate-based pressure sensitive adhesive.

Embodiment 23 is the method of embodiment 17, wherein providing an adhesive composition comprises preparing a non-siloxane polyurethane-based polymer comprising: providing at least one polyisocyanate; providing at least one polyol; reacting the at least one polyisocyanate with the at least one polyol to form the polyurethane-based polymer.

Embodiment 24 is the method of embodiment 23, wherein the at least one polyol comprises a polyalkylene polyol.

Embodiment 25 is the method of embodiment 23 or 24, further comprising a second polyol or a polyamine.

Embodiment 26 is the method of any of embodiments 17-25, wherein the adhesive composition is prepared in at least one solvent.

Embodiment 27 is the method of any of embodiments 17-25, wherein the adhesive composition is prepared in a solventless process.

Embodiment 28 is the method of any of embodiments 17-27, wherein the substrate is the surface of an article, a tape backing, a film, a sheet, or a release liner.

Embodiment 29 is the method of embodiment 28, wherein the film comprises an optically active film comprising a visible mirror film, a color mirror film, a solar reflective film, a diffusive film, an infrared reflective film, an ultraviolet reflective film, a reflective polarizer film such as a brightness enhancement film or a dual brightness enhancement film, an absorptive polarizer film, an optically clear film, a tinted film, a dyed film, a privacy film such as a light-collimating film, a color filter film, an antireflective film, an antiglare film, a soil resistant film, or an antifingerprint film.

Embodiment 30 is the method of any of embodiments 17-29, wherein coating comprises coating on both the first and second major surfaces of the substrate.

Embodiment 31 is method of any of embodiments 17-29, further comprising providing a second adhesive composition and coating the second adhesive composition on at least a portion of the first or second major surface of the substrate, and wherein the second adhesive composition is different from the first adhesive composition.

Embodiment 32 is the method of embodiment 28, wherein the release liner comprises a structured release liner.

EXAMPLES

All parts, percentages, ratios, etc. in the examples are by weight, unless noted otherwise. Solvents and other reagents used were obtained from Sigma-Aldrich Chemical Company; Milwaukee, Wis. unless specified differently.

Materials

| Abbreviation or Trade Designation | Description |
|---|---|
| 2-BEA | biphenyloxyethyl acrylate available from Toagosei Company, Tokyo, Japan. |
| 2-HEA | 2-hydroxylethyl acrylate available from Alfa Aesar, Ward Hill, MA. |

-continued

| Abbreviation or Trade Designation | Description |
|---|---|
| AA | Acrylic acid available from BASF Corporation, Parsippany, NJ. |
| BA | n-butyl acrylate available from BASF Corporation, Parsippany, NJ. |
| Polyamine-1 | Polyoxyalkylene polyamine of approximately 2,000 molecular weight, commercially available as "JEFFAMINE D-2000" from Huntsman, Houston, TX. |
| PUT | A PolyUrea Terpolymer made from the reaction between Polyamine-1, H12MDI, and Polyamine-2 as described in Synthesis Example S1 below. |
| Polyamine-2 | 2-methylpentamethylene diamine commercially available from E. I. Du Pont De Nemours and Co., Wilmington, DE as "DYTEK A". |
| H12MDI | Dicyclohexylmethane 4,4'-Diisocyanate available from Alfa Aesar, Ward Hill, MA. |
| PE Film | Primed polyester film available from Mitsubishi Polyester Film Inc., Greer, SC as "HOSTAPHAN". |
| IOA | Iso-octyl acrylate |
| IOTG | isooctyl thioglycolate available from Pfaltz & Bauer, Inc., Waterbury, CT. |
| IPA | Isopropyl Alcohol |
| IPM | Isopropyl myristate available from Alfa Aesar, Ward Hill, MA. |
| MA | Methyl acrylate |
| MAcEPE | Methacrylated Extended-PolyEther as described in PCT Publication No. WO 2009/085662. |
| PET | UV-primed polyester film of polyethylene terphthalate available under the trade name "DuPont 617" having a thickness of 5 mils (127 micrometers) or 2 mils (51 micrometers) from DuPont Teijin Films, Richmond, VA. |
| PSA-1 | A pressure sensitive adhesive solution, 17.5% solids by weight in ethyl acetate and toluene, of a copolymer PSA with an approximate ratio of monomers of 90/10 IOA/AA prepared as described in U.S. Pat. No. Re. 24,906 (Ulrich). |
| PSA-2 | A pressure sensitive adhesive solution having a composition of IOA/MA/AA (57.5/35/7.5) at 26% solids in ethyl acetate/toluene (73/27) prepared as described in U.S. Pat. No. Re. 24,906 (Ulrich). |
| PSA-3 | An Acrylate PSA prepared as in U.S. patent publication No. 2010/0222496 with refractive index (RFI) of 1.4882. |
| Initiator | 2,2'-azobis(2-methylbutanenitrile) available from E. I. Du Pont De Nemours and Co. Wilmington, DE as "VAZO 67". |
| Plasticizer-1 | Plasticizer with refractive index measured to be 1.4840 commercially available from Ferro Corporation, Walton Hills, OH, under the trade designation "North American SANTICIZER 141". |
| Plasticizer-2 | Plasticizer with refractive index measured to be 1.5002 commercially available from Ferro Corporation, Walton Hills, OH, under the trade designation "North American SANTICIZER 154". |
| Plasticizer-3 | Plasticizer with refractive index measured to be 1.4952 commercially available from Ferro Corporation, Walton Hills, OH, under the trade designation "North American SANTICIZER 160". |
| Benzyl Benzoate | Plasticizer available from Sigma-Aldrich Chemical Company; Milwaukee, WI. |

Test Methods

Titration Method to Determine Molecular Weight

To determine the molecular weight of Polyamine-1, a measured sample weight (between 3-6 grams) was added to a jar of IPA (about 10 times the weight of the sample) with mixing to form a uniform solution. A solution of the indicator bromophenol blue was added until the color was a deep blue. With constant stirring, the sample solution was titrated by adding 1.0 Normal HCl (aq) dropwise until a color change from blue to yellow indicated that the end point was reached. The endpoint volume of HCl titrated was recorded and the molecular weight was calculated. The molecular weight of Polyamine-1 was determined to be about 1993 g/mol.

90° Peel Adhesion Test

Adhesive Coatings of 42.7 microns (1.68 mils) thickness on 50.8 micron (2 mil) thick PET film were cut into 2.54 cm by 28.0 cm (1 inch by 11 inch) strips. Each strip was adhered to a 6.35 cm by 22.9 cm (2.5 inch by 9 inch) clean, solvent washed glass plate using a 5-kilogram roller passed once over the strip. The bonded assembly was tested for 90° peel adhesion using an IMASS slip/peel tester with a 90° peel testing assembly (Model SP2000, commercially available from Instrumentors Inc., Strongsville, Ohio) at a rate of 2.29 meters/minute (90 inches/minute) over a five second data collection time. The reported peel adhesion value is the average of three replicates of each sample. Data was collected in grams per inch width and converted to Newtons per decimeter (N/dm). The samples were either tested after remaining on the glass for 10 minutes at room temperature (initial peel), or the samples were placed in an 85° C. oven for 7 days after being adhered to the glass and then the peel force was measured (aged peel).

180° Peel Adhesion Test

The 180° peel adhesion tests were conducted as generally described in ASTM D 3330/D 3330M-04 (2010)—Test Method A. Two or three 1.3 cm (0.5 inch) wide strips of adhesive coated onto PE Film were adhered to a glass plate by rolling a 2 kg roller over the tape. The force required to peel the tape at an angle of 180 degrees was measured with a platen speed of 30.5 cm/min (12 inches/min). The measurements for the two to three tape samples were averaged. Data was collected in ounces per half inch width and converted to Newtons per decimeter (N/dm). The samples were either tested after remaining on the glass for 10 minutes at room temperature (initial peel), or the samples were placed in an 85° C. oven for 16 hours after being adhered to the glass and then the peel force was measured (aged peel).

Wet Out Test

Adhesive coatings of 30.2 microns (1.19 mils) thickness on 127 micron (5 mil) thick PET film were cut into sample squares 12.7 cm by 12.7 cm (5 by 5 inches). A 12.7 cm by 12.7 cm (5 by 5 inch) square was drawn on a glass plate along with a 7.6 cm by 7.6 cm (3 by 3 inch) square in the center of the 12.7 cm by 12.7 cm (5 by 5 inch) square. The sample square was dropped onto an IPA-washed glass plate. The wet out time was measured using a stopwatch and was started when the wet out front reached any part of the inner marked square and ended when the inner square was completely wetted out. This elapsed time was recorded as the wet out time.

Measurement of Refractive Index (RI)

The refractive index of adhesive coatings was measured using a Metricon 2010M Prism Coupler made by Metricon Corporation of Pennington, N.J., USA.

Haze/Clarity/Transmission Test

Adhesive coatings of 30.2 microns (1.19 mils) thickness (clean samples taken from the unused portion from the wet out test) on 127 micron (5 mil) or 50.8 microns (2 mil) PET film were cut into samples and used in the Haze-Gard Plus, made by BYK Gardner USA, Columbia, Md. A control measurement of the 127 micron (5 mil) PET was taken as a comparison.

Synthesis Examples

Synthesis Example S1

Preparation of PUT

A sample of Polyamine-1 (3 moles) was added to a solvent blend consisting of 50% toluene and 50% 1-methoxy-2-propanol. The solution was stirred for roughly 5 minutes. H12MDI (4 moles) was then added to the mixture and stirred for 15 minutes. An exotherm and an increase in viscosity was observed from the reaction. Polyamine-2 (1 mole) was then added to the solution. A second exotherm and a second increase in viscosity was observed.

Examples 1-19 and Comparative Example C1

PUT was mixed with IPM, a solvent blend of 50% toluene and 50% 1-methoxy-2-propanol, and PSA-1, PSA-2 or PSA-3 according to Table 1 below.

TABLE 1

| | Blend Formulations | | | | |
|---|---|---|---|---|---|
| Example | PSA-2 % of solids | IPM % of solids | PUT % of solids | PSA-1 % of solids | PSA-3 % of solids |
| 1 | 10 | 25 | 65 | 0 | 0 |
| 2 | 20 | 25 | 55 | 0 | 0 |
| 3 | 40 | 25 | 35 | 0 | 0 |
| 4 | 60 | 25 | 15 | 0 | 0 |
| 5 | 75 | 20 | 5 | 0 | 0 |
| 6 | 25 | 10 | 65 | 0 | 0 |
| 7 | 25 | 20 | 55 | 0 | 0 |
| 8 | 25 | 40 | 35 | 0 | 0 |
| 9 | 25 | 60 | 15 | 0 | 0 |
| 10 | 20 | 75 | 5 | 0 | 0 |
| 11 | 25 | 0 | 75 | 0 | 0 |
| 12 | 0 | 25 | 75 | 0 | 0 |
| 13 | 40 | 10 | 50 | 0 | 0 |
| 14 | 10 | 40 | 50 | 0 | 0 |
| 15 | 0 | 0 | 100 | 0 | 0 |
| 16 | 0 | 25 | 50 | 25 | 0 |
| 17 | 0 | 45 | 50 | 5 | 0 |
| 18 | 0 | 5 | 50 | 45 | 0 |
| 19 | 0 | 25 | 30 | 0 | 45 |

The blend was then cast on PET for testing and put in a solvent rated 70° C. oven for ten minutes to dry all of the solvent from the adhesive coating. Examples 1-18 were tested on 127 micron (5 mil) PET and Example 19 was tested on 51 micron (2 mil) PET. The adhesive was then put through the following tests using the test methods described above: 90° Peel Adhesion Test; Wet Out Test; Measurement of Refractive Index (RI); and the Haze/Clarity/Transmission Test. For comparison the transmission, haze and clarity is reported for 127 micron (5 mil) PET. Comparative Example C1, which utilized a cured MAcEPE formulation, was prepared as described in Example 4 of PCT publication number WO 2009/085662. The test results are reported in Table 2 below.

TABLE 2

| Example | Initial 90° Peel (N/dm) | Aged 90° Peel (N/dm) | Average Wet Out Time (sec/cm$^2$) | % Transmission | % Haze | % Clarity | RI |
|---|---|---|---|---|---|---|---|
| 1 | 22.17 | 21.01 | 0.23 | 92.8 | 5.14 | 90.4 | 1.4599 |
| 2 | 18.61 | 24.46 | 0.30 | 92.8 | 4.81 | 90 | 1.4612 |
| 3 | 30.18 | 30.72 | 0.49 | 92.9 | 4.01 | 89.4 | 1.4640 |
| 4 | 31.38 | 61.39 | 0.46 | 92.9 | 3.64 | 90.5 | 1.4638 |
| 5 | 36.68 | 89.64 | 0.46 | 92.8 | 3.75 | 90.9 | 1.4658 |
| 6 | 47.91 | 42.94 | 0.35 | 92.8 | 4.89 | 90.7 | 1.4669 |
| 7 | 22.71 | 27.85 | 0.24 | 92.8 | 4.38 | 91.1 | 1.4632 |
| 8 | 5.58 | 15.95 | 0.13 | 93 | 0.9 | 94.3 | 1.4554 |
| 9 | 0.13 | 16.32 | 0.03 | 93.1 | 17.3 | 69.6 | 1.4551 |
| 10 | 0.11 | 15.87 | 0.04 | 95 | 2.26 | 93.2 | 1.4539 |
| 11 | 40.90 | 50.79 | 1.60 | 92.7 | 4.9 | 91.2 | 1.4706 |
| 12 | 2.86 | 6.66 | 0.17 | 92.9 | 4.56 | 89.9 | 1.4599 |
| 13 | 43.87 | 48.99 | 0.29 | 92.8 | 4.44 | 90.9 | 1.4682 |
| 14 | 15.90 | 13.14 | 0.16 | 93 | 3.88 | 89 | 1.4543 |
| 15 | 7.76 | 54.38 | 0.33 | 92.8 | 4.62 | 91.8 | 1.4695 |
| 16 | 10.70 | 6.86 | 0.49 | 92.9 | 4.01 | 90.6 | 1.4629 |
| 17 | 0.82 | 2.76 | 0.06 | 92.9 | 2.24 | 89.9 | 1.4532 |
| 18 | 42.15 | 12.49 | 1.46 | 92.8 | 3.17 | 93.1 | 1.4697 |
| 19 (2 mil PET) | N/A | N/A | 0.36 | N/A | N/A | N/A | 1.4645 |
| 5 mil PET | N/A | N/A | N/A | 93 | 1.21 | 100 | N/A |
| C-1 | 3.90 | 10.31 | 2.08 | N/A | N/A | N/A | N/A |

N/A = not applicable, meaning the test was not run

Examples 20-27

Examples 20-27 were prepared according to Table 3 below. The polymerization was carried out by adding monomers, chain transfer agent and thermal initiator, at 40% percent solids in ethyl acetate solvent, into a reaction vessel heated for 24 hours at 60° C.

TABLE 3

| Example | BA | AA | 2-BEA | 2-HEA | IOTG | Initiator |
|---|---|---|---|---|---|---|
| 20 | 70 | 10 | 20 | 0 | 0.03 | 0.15 |
| 21 | 50 | 10 | 40 | 0 | 0.03 | 0.15 |
| 22 | 57 | 10 | 40 | 0 | 0.03 | 0.15 |
| 23 | 85 | 5 | 10 | 0 | 0.03 | 0.15 |
| 24 | 75 | 5 | 20 | 0 | 0.03 | 0.15 |
| 25 | 55 | 5 | 40 | 0 | 0.03 | 0.15 |

TABLE 3-continued

| Example | BA | AA | 2-BEA | 2-HEA | IOTG | Initiator |
|---|---|---|---|---|---|---|
| 26 | 47 | 3 | 40 | 10 | 0.03 | 0.15 |
| 27 | 37 | 3 | 40 | 20 | 0.03 | 0.15 |

The resulting acrylic polymers were blended with PUT according to Tables 4 and 5 below. The co-polymers were further diluted to 20% solids using toluene or ethyl acetate and coated onto 51 micron (2 mil) PE Film. The adhesive was dried at 70° C. for 15 minutes to remove the solvent.

The samples were then tested using the test methods described above and the results are reported in Tables 4 and 5 below.

TABLE 4

| Example | PUT % of solids | Acrylic Polymer % of solids | Acrylic Polymer Used | Solvent Added | RI | % Haze |
|---|---|---|---|---|---|---|
| 28 | 50 | 50 | Example 23 | ethyl acetate | 1.4768 | 4.5 |
| 29 | 35 | 65 | Example 23 | ethyl acetate | 1.4773 | 4 |
| 30 | 65 | 35 | Example 23 | ethyl acetate | 1.4742 | 3.7 |
| 31 | 50 | 50 | Example 20 | ethyl acetate | 1.4849 | 4.4 |
| 32 | 35 | 65 | Example 20 | ethyl acetate | 1.4897 | 4.4 |
| 33 | 65 | 35 | Example 20 | ethyl acetate | 1.4808 | 4.7 |

TABLE 5

| Example | PUT % of solids | Acrylic Polymer % of solids | Acrylic Polymer Used | Solvent Added | Initial 180° Peel (N/dm) | Aged 180° Peel (N/dm) | Wet Out (s/cm$^2$) | RI |
|---|---|---|---|---|---|---|---|---|
| 34 | 65 | 35 | Example 26 | ethyl acetate | 68.69 | 20.00 | 4.84 | 1.4895 |
| 35 | 65 | 35 | Example 26 | toluene | 49.08 | 22.78 | 5.38 | 1.4890 |

Examples 36-39

PUT was mixed with PSA-2 in a solvent blend of 50% toluene and 50% 1-methoxy-2-propanol, with the Plasticizers shown in Table 6 below. Each blend was then cast on 127 micron (5 mil) PET for testing and put in a solvent rated 70° C. oven for ten minutes to dry all of the solvent from the adhesive coating. The refractive index of the adhesive was then measured according to the Measurement of Refractive Index (RI) test described above and the results are reported in Table 6 below. All examples were observed to be self wetting.

TABLE 6

| Example | PSA-2 (grams) | Plasticizer used | Plasticizer (grams) | PUT (grams) | Additional solvent blend consisting of 50% toluene and 50% 1-methoxy-2-propanol (grams) | RI |
|---|---|---|---|---|---|---|
| 36 | 7.50 | Plasticizer-1 | 2.42 | 7.00 | 3.18 | 1.4208 |
| 37 | 7.49 | Plasticizer-2 | 2.42 | 6.99 | 3.12 | 1.5365 |
| 38 | 7.51 | Plasticizer-3 | 2.41 | 6.99 | 3.19 | 1.6079 |
| 39 | 11.36 | Benzyl Benzoate | 3.61 | 10.53 | 4.89 | 1.5059 |

What is claimed is:

1. An adhesive composition comprising:
   a non-siloxane polyurea-based polymer, a non-siloxane polyurethane-based polymer, or a blend of a non-siloxane polyurea-based and non-siloxane polyurethane-based polymers, wherein the non-siloxane polyurea-based polymer or non-siloxane polyurethane-based polymer is free of free radically polymerized groups; and
   at least one (meth)acrylate-based pressure sensitive adhesive, wherein the (meth)acrylate-based pressure sensitive adhesive comprises a (meth)acrylate copolymer comprising at least one alkyl (meth)acrylate monomer and at least one reinforcing monomer selected from: an acidic monomer; or a basic monomer; or styrene, wherein if the reinforcing monomer is an acidic monomer it comprises 2-15 weight % of the total monomer composition of the (meth)acrylate copolymer, and
   wherein the adhesive composition comprises a self-wetting, pressure sensitive adhesive.

2. The composition of claim 1, wherein the non-siloxane polyurea-based polymer or non-siloxane polyurethane-based polymer comprises a segmented copolymer, which copolymer comprises repeating units of Formula I:

$$\left[\left[\begin{matrix}O\\\|\\C-N-Z-N-C-W-B-W\\|\quad\quad|\\H\quad\quad H\end{matrix}\right]_a\begin{matrix}O\\\|\\C-N-Z-N-C-W-Y-W\\|\quad\quad|\\H\quad\quad H\end{matrix}\right]_m \quad (I)$$

wherein:
   each W is N-D or O;
   each B is independently a polyvalent radical;
   each D is independently selected from the group consisting of hydrogen, an alkyl group, a cycloalkyl group, a phenyl group, a group that completes a ring structure that includes B to form a heterocycle, and mixtures thereof;
   each Z is independently a polyvalent radical;
   each Y is independently a polyoxyalkylene;
   m is an integer greater than zero; and
   a is zero or an integer greater than zero.

3. The composition of claim 2, wherein Y is selected from the group consisting of polyethylene oxide, polypropylene oxide, polytetramethylene oxide, or a combination thereof.

4. The composition of claim 2, wherein W is N-D.

5. The composition of claim 2, wherein a is an integer greater than zero.

6. The composition of claim 2, wherein B is a polyalkylene or a polyoxyalkylene.

7. The composition of claim 1, further comprising at least one plasticizer.

8. The composition of claim 7, wherein the plasticizer has a refractive index of greater than 1.48.

9. The composition of claim 1, wherein the (meth)acrylate-based pressure sensitive adhesive comprises a refractive index of greater than 1.48.

10. An adhesive article comprising:
    a substrate with a first major surface and a second major surface; and
    an adhesive composition coated on at least a portion of at least the first or second major surface of the substrate, wherein the adhesive composition comprises:
       a non-siloxane polyurea-based polymer, a non-siloxane polyurethane-based polymer, or a blend of a non-siloxane polyurea-based and non-siloxane polyurethane-based polymers, wherein the non-siloxane polyurea-based polymer or non-siloxane polyurethane-based polymer is free of free radically polymerized groups; and
       at least one (meth)acrylate-based pressure sensitive adhesive, wherein the (meth)acrylate-based pressure sensitive adhesive comprises a (meth)acrylate copolymer comprising at least one alkyl (meth)acrylate monomer and at least one reinforcing monomer selected from: an acidic monomer; or a basic monomer; or styrene, wherein if the reinforcing monomer is an acidic monomer it comprises 2-15 weight % of the total monomer composition of the (meth)acrylate copolymer, and
       wherein the adhesive composition comprises a self-wetting, pressure sensitive adhesive.

11. The adhesive article of claim 10 wherein the substrate is the surface of an article, a tape backing, a film, a sheet, or a release liner.

12. The adhesive article of claim 11 wherein the film comprises an film selected from the group consisting of a visible mirror film, a color mirror film, a solar reflective film, a diffusive film, an infrared reflective film, an ultraviolet reflective film, a brightness enhancement film, a dual brightness enhancement film, an absorptive polarizer film, an optically clear film, a tinted film, a dyed film, a privacy film, a color filter film, an antireflective film, an antiglare film, a soil resistant film, or an antifingerprint film.

13. The adhesive article of claim 11, wherein the film comprises a polymeric film selected from the group consisting of a stretchable film; a graphic film; a label stock film; or a transparent conductive film.

14. The adhesive article of claim 10, wherein the substrate comprises a light guide film or substrate.

15. The adhesive article of claim 11, wherein the release liner comprises a structured release liner.

16. A method of preparing an adhesive article comprising:
    providing a first adhesive composition comprising:
       a non-siloxane polyurea-based polymer, a non-siloxane polyurethane-based polymer, or a blend of non-siloxane polyurea-based and non-siloxane polyurethane-based polymers, wherein the non-siloxane polyurea-based polymer or non-siloxane polyurethane-based polymer is free of free radically polymerized groups; and at least one (meth)acrylate-based pressure sensitive adhesive, wherein the (meth)acrylate-based pressure sensitive adhesive comprises a (meth)acrylate copolymer comprising at least one alkyl (meth)acrylate monomer and at least one reinforcing monomer selected from: an acidic monomer; a basic monomer; or styrene, wherein if the reinforcing monomer is an acidic monomer it comprises 2-15 weight % of the total monomer composition of the (meth)acrylate copolymer, to form a self-wetting, pressure sensitive adhesive;

providing a substrate with a first major surface and a second major surface; and coating the first adhesive composition on at least a portion of at least the first or the second major surface of the substrate.

17. The method of claim 16, wherein providing an adhesive composition comprises preparing a non-siloxane polyurea-based polymer, comprising:

providing at least one polyisocyanate;
providing at least one polyamine;
reacting the at least one polyisocyanate with the at least one polyamine to form the polyurea-based polymer.

18. The method of claim 17, wherein the preparing the non-siloxane polyurea-based polymer comprises polymerizing in a solution containing the (meth)acrylate-based pressure sensitive adhesive.

19. The method of claim 16, wherein providing an adhesive composition comprises preparing a non-siloxane polyurethane-based polymer comprising:

providing at least one polyisocyanate;
providing at least one polyol;
reacting the at least one polyisocyanate with the at least one polyol to form the polyurethane-based polymer.

20. The method of claim 16, wherein the adhesive composition is prepared in a solventless process.

21. The method of claim 16, wherein the substrate is the surface of an article, a tape backing, a film, a sheet, or a release liner.

22. The method of claim 16, wherein coating comprises coating on both the first and second major surfaces of the substrate.

* * * * *

UNITED STATES PATENT AND TRADEMARK OFFICE
CERTIFICATE OF CORRECTION

PATENT NO. : 9,738,818 B2  
APPLICATION NO. : 14/495949  
DATED : August 22, 2017  
INVENTOR(S) : Sherman et al.

Page 1 of 1

It is certified that error appears in the above-identified patent and that said Letters Patent is hereby corrected as shown below:

On the Title Page

Item (54) Column 1 (Title)  
Line 2, delete "SENSTIVE" and insert -- SENSITIVE --, therefor.

In the Specification

Column 1  
Line 2, delete "SENSTIVE" and insert -- SENSITIVE --, therefor.

Column 5  
Line 62-63, delete "calorimetry" and insert -- Calorimetry --, therefor.

Column 7  
Line 2-3, delete "poloxyyalkylenes" and insert -- polyoxyalkylene --, therefor.

Column 10  
Line 32, after "polyamine" insert -- . --.

Column 11  
Line 9-10, delete "-chloro aniline);" and insert -- -chloroaniline); --, therefor.

In the Claims

Column 34  
Line 47, in Claim 12, after "comprises an" insert -- optical --.

Signed and Sealed this  
Twenty-sixth Day of March, 2019

Andrei Iancu  
*Director of the United States Patent and Trademark Office*